Oct. 4, 1927.
M. W. McARDLE
1,644,141
VIBRATING CUTTER FOR SHEEP SHEARS
Filed June 11, 1926
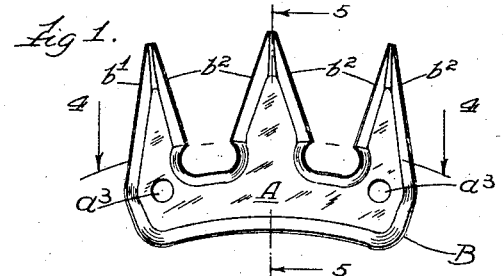
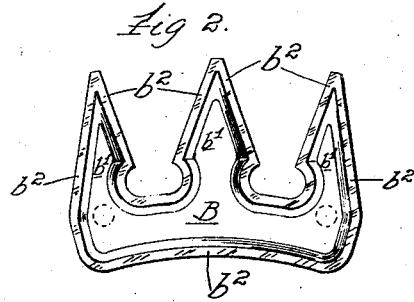
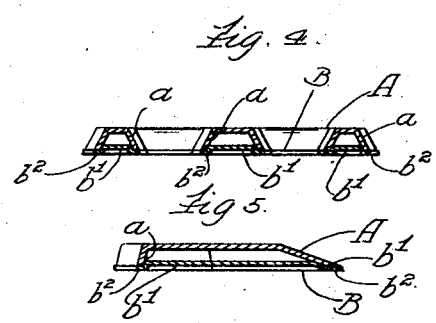
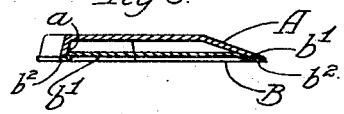
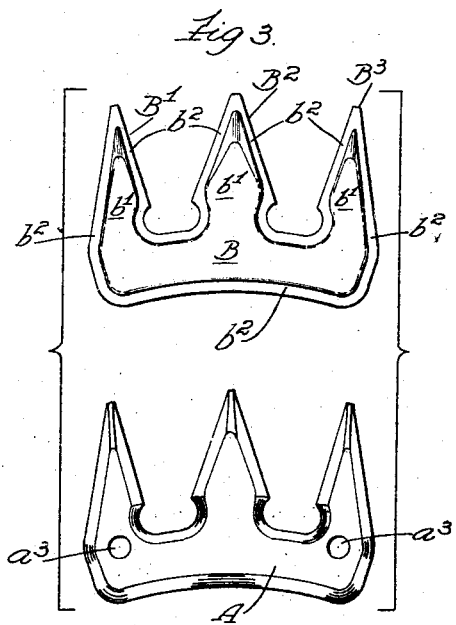
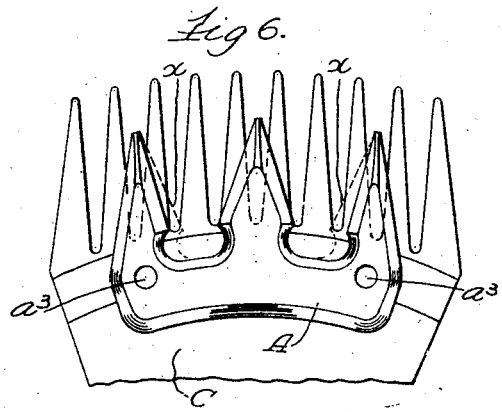
Witness.
H. O. McKnight
Inventor.
Michael W. McArdle.
by Burton & Burton
his Attorneys.

Patented Oct. 4, 1927.

1,644,141

UNITED STATES PATENT OFFICE.

MICHAEL W. McARDLE, OF CHICAGO, ILLINOIS.

VIBRATING CUTTER FOR SHEEP SHEARS.

Application filed June 11, 1926. Serial No. 115,195.

One purpose of this invention is to provide a vibrating or reciprocating cutter for a sheep shear and the like which shall have the shearing edges formed as the edges of a thin sheet metal cutting member, separable from the body of the cutter and adapted to be readily detached for sharpening after the manner of thin blades of safety razors and like implements, and which may even be discarded when dulled, and substituted by another, the total cost of the blade being no more than the cost of grinding the integral cutters now commonly employed.

Another purpose of this invention is to provide a vibrating cutter suitable for being reciprocated in the arc of a circle, and having its cutting teeth correspondingly disposed in arcuate arrangement, for co-operating with a fixed cutter or comb of a shearing tool having its comb teeth disposed in like arcuate arrangement, but all substantially parallel, (as is usual and desirable for properly penetrating the wool and gathering it to the cutter in such manner as to be evenly sheared,—leaving the stubble of uniform length), which vibrating cutter shall have the converging cutting edges of radially diverging teeth, sloped so as to intersect the co-operating shear edges of the parallel teeth of the comb or fixed cutter at substantially equal angles favorable for shearing. The invention consists in the elements and features of construction shown and described as indicated in the claims.

In the drawings:—

Figure 1 is a top plan view of a cutter adapted to serve as the vibrating cutter of a sheep shear and the like, constructed in accordance with this invention.

Figure 2 is an inverted or under side plan view of the same.

Figure 3 is a top plan view of the cutting member and body member separated from each other.

Figure 4 is a section at the line 4—4 on Figure 1.

Figure 5 is a section at the line 5—5 on Figure 1.

Figure 6 is a plan view of the vibrating cutter represented in Figure 1, the same being shown in working position on the co-operating fixed cutter or comb of a sheep shear, for showing the angular relation of the opposite cutting edges of the diverging teeth of the vibrating cutter to the co-operating edges of the parallel comb teeth.

In the drawings, A represents the body or actuating member of a device adapted to serve as the vibrating or reciprocating cutter of a sheep shear and the like. B represents the cutting member of such a tool. C represents the fixed cutter or comb of a sheep shear with which the vibrating cutter, A, B, is adapted to co-operate.

The body or actuating member, A, is a metal stamping formed substantially as it is now customary to form the entire vibrating cutter of a sheep shear, with a peripheral downwardly projecting flange, $a$, such as in the customary form of the vibrating cutter of such tools has shearing edges for co-operating shearwise with the shear edges of the comb teeth; but in the present construction, the body member, A, is made of soft iron or steel without hardening or tempering, because its function is not to have the shearing edges, and it has only the function of pressing and holding the cutting member, B, onto the comb for shearing co-operation of the teeth of said cutting member with the comb teeth. The member, B, is made of thin sheet steel, susceptible of proper hardening and tempering to fit it for having effective shearing edges. It is made from a blank which is die cut from sheet steel, so that the peripheral edges, including the edges of the teeth, $B^1$, $B^2$ and $B^3$, make right angles with the opposite surfaces of the blank (though the shearing edges of the teeth may be ground slightly beveled if preferred), and it is struck up to form an upraise comprising the parts, $b^1$, $b^1$, $b^1$, fitting closely within the downwardly projecting flange, $a$, of the body or actuating member, A, the marginal area, $b^2$, left in the normal plane of the blank, being only about 10/1000″ wider than the thickness of the sheet metal from which the body stamping, A, is formed; so that when the two members are assembled as seen in Figure 1, the shearing edges of the teeth of the cutting member project only just visibly from under the flange of the body or actuating member.

The actuating member, it will be understood, is formed suitably for being engaged and actuated by the actuating means of whatever nature with which the shearing tool is provided, which usually consists of vibrating parts having terminals for engaging the vibrating cutter at apertures in the latter; and such apertures are shown at $a^3$, $a^3$, in the actuating member, A.

With respect to the second mentioned purpose of the invention it will be noted that with a fixed cutter or comb having the comb teeth disposed in arcuate arrangement, but substantially parallel to each other as to the medial lines through the points of their narrowly tapered teeth, as seen in Figure 6, and a similarly arcuate cutter having teeth tapered symmetrically about radial lines through their points, and vibrating in the arc in which the teeth are disposed, the angles of intersection of the opposite shearing edges of the laterally positioned teeth of the vibrating cutter with the respective co-operating edges of the fixed comb teeth, will be quite different; and if the taper of the teeth of the vibrating cutter is such as to make that angle the most efficient for shearing at the outer edge of the teeth, the angle of intersection of the inner edge with the co-operating edge of the co-operating comb tooth will be not the most efficient. In order to make these angles of intersection of both edges of the laterally positioned teeth of the vibrating cutter as nearly as possible equally efficient, and as efficient as possible, the lateral teeth,—those at opposite sides of the middle tooth of the vibrating cutter,—are made non-symmetrical about the radial lines through their points, the inner side edge being at a more acute angle to said radial line than the outer side which, as may be seen in Figure 6 in which the dotted line, *x*, indicates the position which the inner edge of the tool would occupy if the tool were symmetrical about a radial line through its point.

I claim:—

1. A reciprocating cutter for a sheep shear and the like comprising a body member adapted for engagement by the actuating means of the tool, said body member being flanged downwardly at its periphery, forming a hollow in its under side, and a cutting member peripherally conformed to the body member and struck up within its periphery, forming an upward protrusion fitting within the peripheral flange of the body member; whereby the two members are positively engaged for actuation of the cutting member with the body member in the reciprocatory movement.

2. A cutting blade for a sheep shear and the like comprising a thin sheet metal cutting member struck upwardly within a teeth-encompassing narrow marginal area, and a body member peripherally conformed to the cutting member throughout the cutting edges of the latter, and having a downwardly protruding flange for fitting about the upstruck area of the cutting member and seating upon the narrow marginal area thereof.

3. In a sheep shear and the like, a fixed comb member having tapered teeth substantially parallel as to their medial longitudinal lines; a vibrating cutter having a plurality of teeth symmetrically disposed about a medial fore and aft line, each tapered to a point at the forward end, the teeth at opposite sides of the middle being each rendered non-symmetrical by having its outer side cutting edges differently inclined to a line through its point radial with respect to the arc of vibration, the angle of the inner edge to said radial line being more acute than the corresponding angle of the opposite edge to said line, to cause said opposite edges to intersect the respective co-operating edges of the comb teeth at substantially equally acute angles.

In testimony whereof, I have hereunto set my hand at Chicago, Ill., this 8th day of June, 1926.

MICHAEL W. McARDLE